United States Patent [19]

Garrett

[11] 4,378,852
[45] Apr. 5, 1983

[54] WEDGE LOCK STABILIZER

[76] Inventor: William R. Garrett, 24 Palmer Dr., Conroe, Tex. 77302

[21] Appl. No.: 252,471

[22] Filed: Apr. 9, 1981

[51] Int. Cl.³ .......................................... E21B 17/10
[52] U.S. Cl. .................................. 175/325; 175/406; 175/408; 166/173; 308/4 A; 403/381
[58] Field of Search ............... 308/4 A; 175/325, 406, 175/407, 408; 166/170, 173, 241; 403/381

[56] References Cited

U.S. PATENT DOCUMENTS

| | | | |
|---|---|---|---|
| 3,535,204 | 10/1970 | Truxa | 403/381 |
| 3,560,060 | 12/1968 | Morris | 166/241 |
| 3,818,999 | 6/1974 | Garrett | 175/325 |
| 4,106,823 | 8/1978 | Bassinger | 308/4 A |
| 4,190,124 | 2/1980 | Terry | 175/406 |
| 4,227,586 | 10/1980 | Bassinger | 175/346 |
| 4,231,437 | 11/1980 | Swersky et al. | 175/408 |
| 4,280,742 | 7/1981 | Justman | 166/241 |

FOREIGN PATENT DOCUMENTS 1098894  4/1981  Canada ................. 175/408

OTHER PUBLICATIONS

Oncor Drilling Tools General Catalog, 1980-81, pp. 14-16.

Primary Examiner—William F. Pate, III
Assistant Examiner—William P. Neuder
Attorney, Agent, or Firm—Frank S. Vaden, III; Marvin B. Eickenroht; Emil J. Bednar

[57] ABSTRACT

A drill string stabilizer in which the wall-contacting wear elements are secured in their accommodating slots by an undercut along each side and a tapered wedge-receiving notch along the underneath side for accepting one or more wedge pieces. In one embodiment, the tapered notch is along the side of an axially elongate slot and a plurality of wedges are located in securing position along one side. In another embodiment, there are tapered notches along the center between two separated sections of wear elements. In a third embodiment, the slot for the wear elements is not axially elongated but on a spiral angle. In a fourth embodiment, a plurality of short wear elements are employed end-to-end, each with its own wedge piece and each also located on a thrust-bearing and locating pin.

14 Claims, 11 Drawing Figures

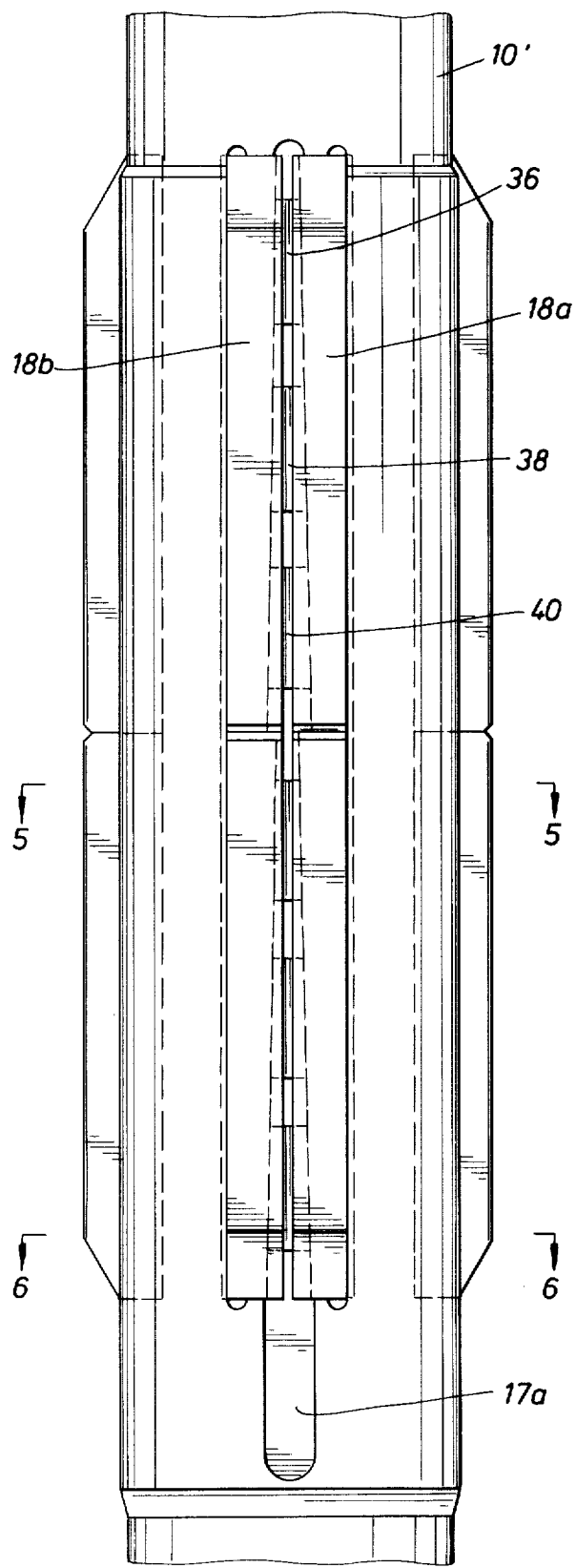
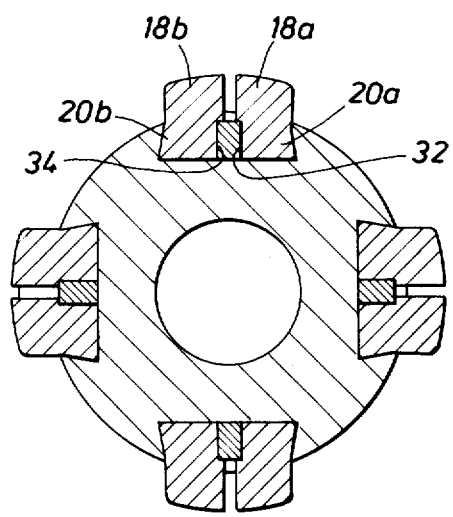
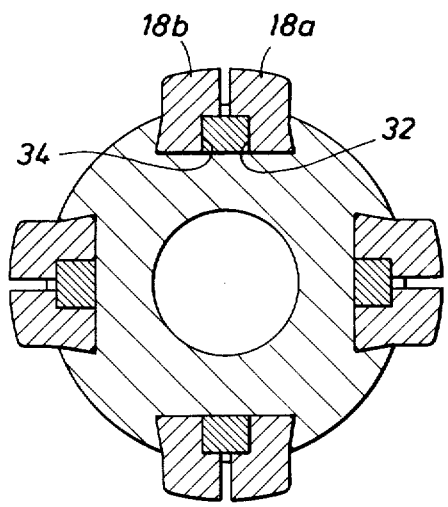

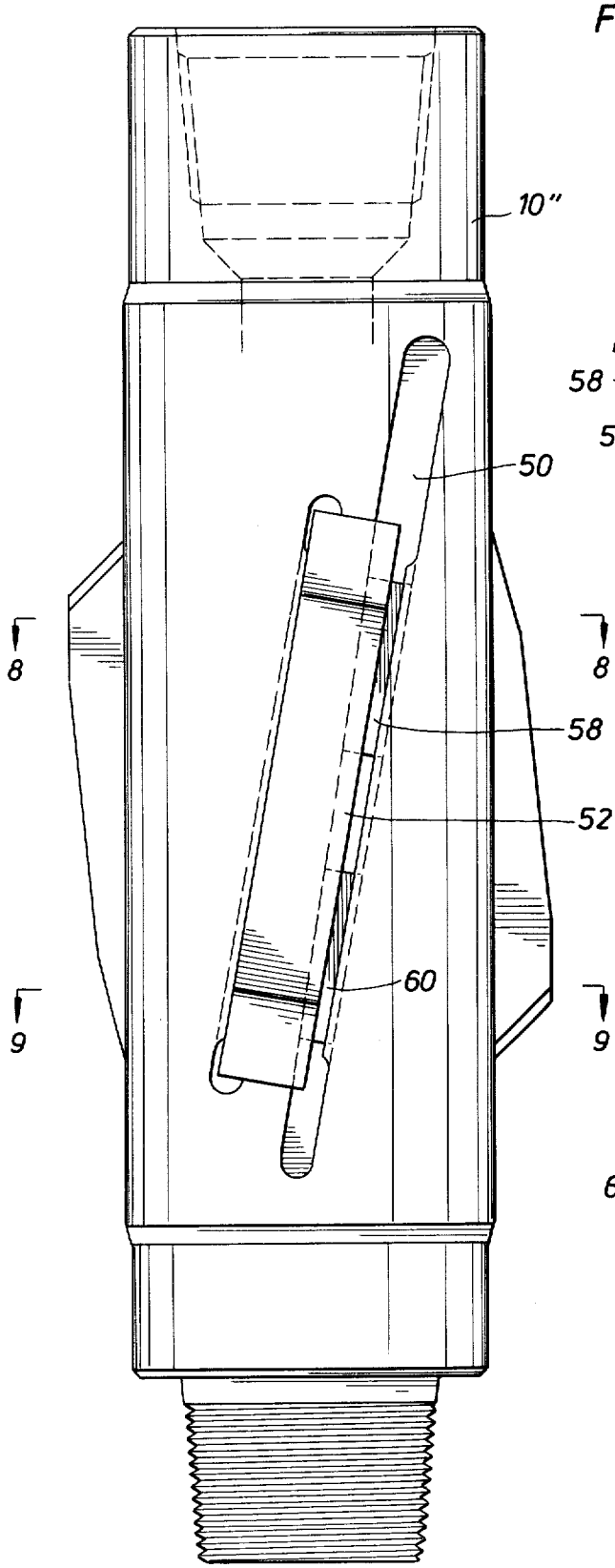
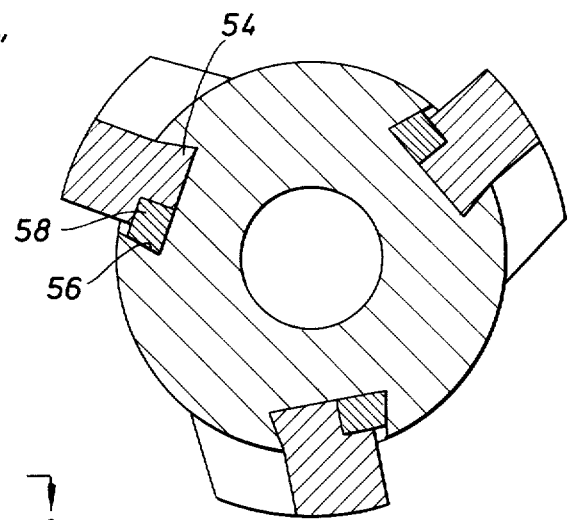
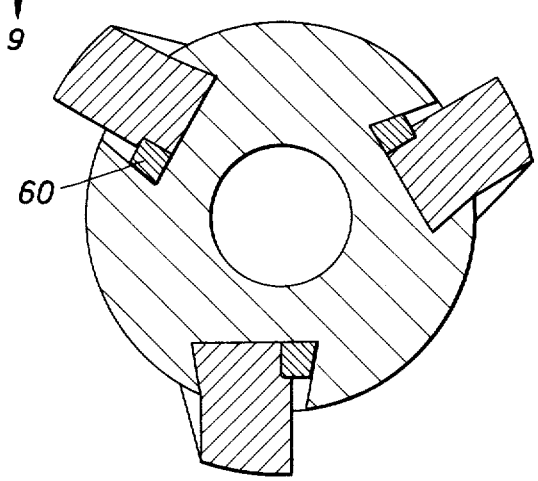

WEDGE LOCK STABILIZER

BACKGROUND OF THE INVENTION

1. Field of the Invention

This invention pertains to that part of borehole drilling apparatus known as stabilizers and more specifically to a type of stabilizer which can be characterized as a removable, wedge-lock type stabilizer.

2. Description of the Prior Art

Stabilizers, sometimes referred to as drill collar stabilizers or as drill stem stabilizers, have been employed in earth boring operations for the petroleum industry to centralize the drill stem in the borehole, usually especially in the drill collar section at a distance of from 100 feet to 300 feet above the drill bit. The purposes of a stabilizer are to (1) help control hole angle direction, (2) prevent the bit from drifting laterally, which would result in undesirable dog-legs and ledges, and (3) improve bit performance by forcing the bit to centrally rotate about its axis so as to provide substantially equal force loading on all three drill bit cones. In addition, stabilizers also may be used to provide a reaming function for undersized or irregularly shaped boreholes provided the formation is not too hard. Rolling cutter reamers are employed to provide these functions for formations too hard to be thus treated by a stabilizer.

Stabilizers may be further categorized as rotating stabilizers and as non-rotating stabilizers. Non-rotating stabilizers do not rotate as the drill string is turned, its wall-contacting members merely moving longitudinally along the wall as the drill string is lowered and raised. On the other hand, a rotating stabilizer includes wall-contacting members that rotationally track along the wall of the borehole as the drill string is turned. In addition, rotating stabilizers can be further divided into fixed-contact and rolling contact types, which latter type would be functionally equivalent to a roller-reamer.

The contacting members of a fixed-contact type of stabilizer, which is the type of stabilizer described herein, are subjected to the various forces attendant to the entire drill string, the severest of which is often the longitudinal thrust force and the most constant and aggravating of which are the fretting forces. It should be noted that forces applied to the drill string are a result of the drill string manipulations, the conditions of the bore, and the fluid conditions internal and external to the drill string.

One fixed-contact type stabilizer is shown in U.S. Pat. No. 3,454,308, Kennedy, in which two wear bars are positioned end-to-end on either side of a locking bar within an accommodated slot, the wear bars being dovetailed to fit under tapered end surfaces of the slot and a locking bar. The locking bar is secured by a cap screw. Should the cap screw not be adequately tightened or should the cap screw vibrate loose, the wear bars are in danger of falling out during use of the tool.

Another fixed-contact type stabilizer is shown in U.S. Pat. No. 3,818,999, Garrett, in which the wear elements are accommodated in a V-section groove, the wear elements being held in place by cap screws. Only the cap screws provide surfaces for resisting the thrust forces and a broken or loosened cap screw will cause the wear element ordinarily held thereby to be dislodged.

A third type of fixed-contact stabilizer is shown in U.S. Pat. No. 4,106,823, Bassinger, in which tapered pairs of wear pads are wedged side by side in an accommodating slot, the pads being dovetailed along their sides and held thereby by tapered slot side surfaces to secure against lateral dislodging. Such pads are set in place by striking the ends with a mallet or hammer, with variable results depending on how well the tapered surfaces fit together and on the human element. High thrust loading and fretting can loosen and dislodge such pads during use either because the pads are not tightly sealed or because the uneven surfaces do not permit uniform tightening along their entire lengths.

Therefore, it is a feature of the present invention to provide an improved stabilizer in which the wear elements are tapered on the underneath side and secured in place by one or more wedging pieces.

It is another feature of the present invention to provide an improved stabilizer in which there are a plurality of wear elements in a single pocket, each one being separately secured therein by a tapered underneath side and by one or more mating wedge pieces.

It is still another feature of the present invention to provide an improved stabilizer in which there are at least two wear elements in a single pocket that are horizontally aligned, the opposing underneath surfaces of which taper toward one another, thereby permitting one or more wedge pieces to be used therebetween for securing the wear elements in place.

SUMMARY OF THE INVENTION

The fixed-contact stabilizer embodiments of the invention herein disclosed employ, at each wear element, a tapered underneath surface on one side. In a first embodiment a plurality of wear elements are positioned end-to-end within each of the axially aligned, elongate slots, which are also undercut to either side. Each of the wear elements has a side mating with a first side of the undercut slot. A plurality of wedge pieces, which are also undercut in configuration, are driven longitudinally between the tapered side of the wear elements and the second side of the undercut slot to secure the wear elements in place.

A second embodiment employs wear elements that fit into the same type of slots, but the wear elements are dimensioned such that two mirror segments can be placed in a slot side by side, a first of the segments mating with a first side of the undercut slot and the second of the segments mating with the second side of the undercut slot. The oppositely-aligned, underneath surfaces taper toward each other to permit one or more tapered wedge pieces therebetween to be employed to outwardly secure the segments.

Another embodiment employs slots which are not axially aligned, but are at an angle to the axis. Yet another embodiment employs short wear elements, each individually positioned by a radially projecting thrust-sharing pin engaging an accommodating hole in the wear element.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope, for the invention may admit to other equally effective embodiments.

IN THE DRAWINGS

Figure 1:
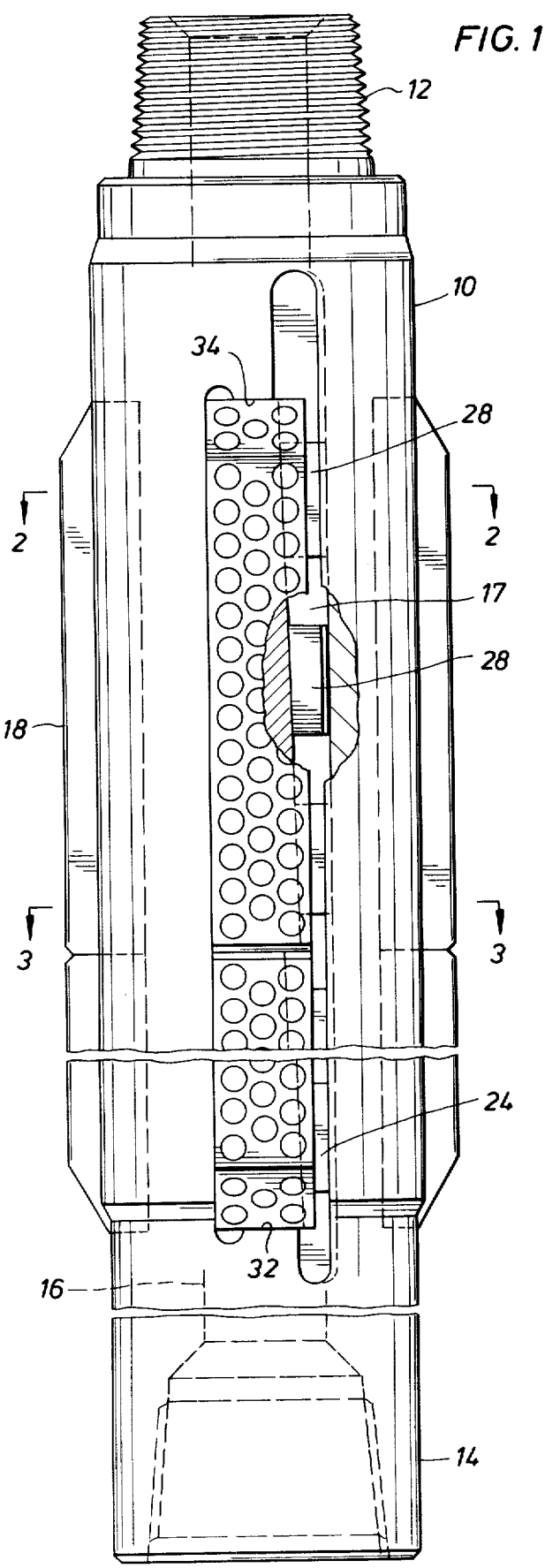

FIG. 1 is a longitudinal cross-sectional view of a portion of a preferred embodiment of a wedge lock stabilizer in accordance with the present invention.

Figure 2:
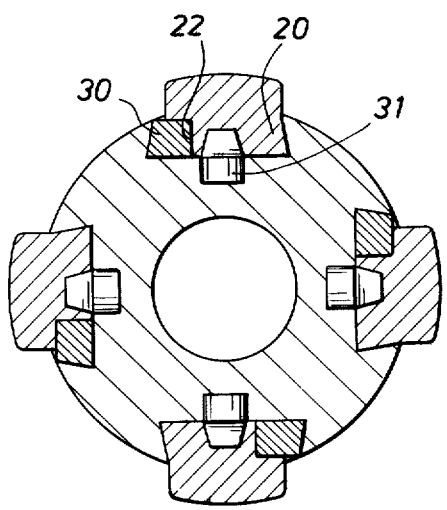

FIG. 2 is a cross-sectional view taken at line 2—2 of FIG. 1.

Figure 3:
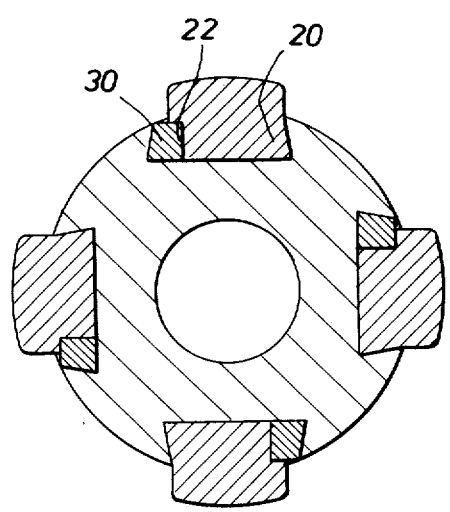

FIG. 3 is a cross-sectional view taken at line 3—3 of FIG. 1.

FIG. 4 is a longitudinal cross-sectional view of a portion of another preferred embodiment of a wedge lock stabilizer in accordance with the present invention.

FIG. 5 is a cross-sectional view taken at line 5—5 of FIG. 4.

FIG. 6 is a cross-sectional view taken at line 6—6 of FIG. 4.

FIG. 7 is a longitudinal cross-sectional view of a portion of yet another preferred embodiment of a wedge lock stabilizer in accordance with the present invention.

FIG. 8 is a cross-sectional view taken at line 8—8 of FIG. 7.

FIG. 9 is a cross-sectional view taken at line 9—9 of FIG. 7.

Figure 10:
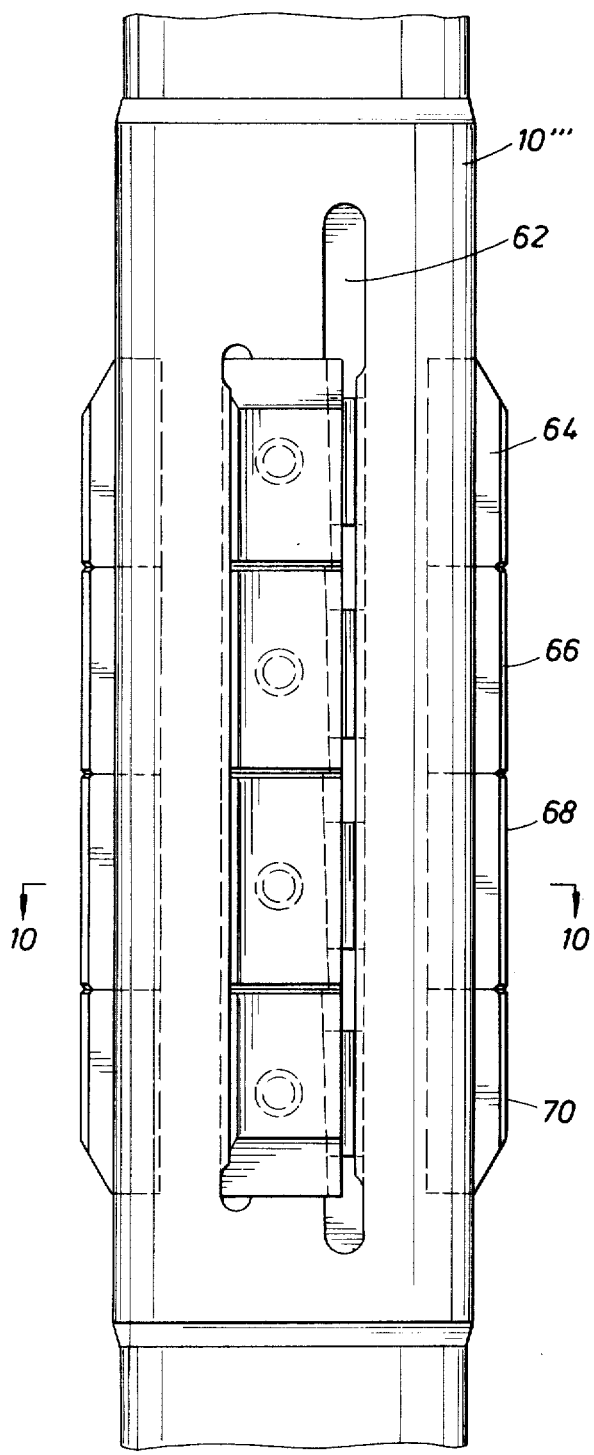

FIG. 10 is a longitudinal cross-sectional view of a portion of still another preferred embodiment of a wedge lock stabilizer in accordance with the present invention.

Figure 11:
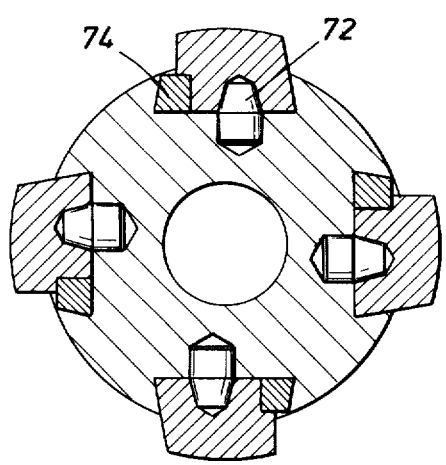

FIG. 11 is a cross-sectional view taken at line 11—11 of FIG. 10.

DESCRIPTION OF THE PREFERRED EMBODIMENTS

Now referring to the drawings, and first to FIG. 1, a stabilizer in accordance with the present invention is shown in longitudinal cross-section. Body 10 of the illustrated stabilizer tool is threaded at threads 12 and 14 for suitable connection to adjoining members cooperatively threaded therewith in the drill string. Stabilizers can be used immediately above the drill bit or at a higher location in the string. When used at the lower location, they are included in a tool in which the pin end is up. When used at a higher level above a tool that includes two box ends, thereafter tools will be positioned with their pin ends down. The stabilizers disclosed herein may be tool sections in which the pin end is down or the pin end is up, the embodiments shown herein sometimes being illustrated one way and sometimes the other.

As is shown in FIG. 1, threads 12 appear in the pin or upper end of the tool as shown and threads 14 appear in the box or lower end of the tool, as illustrated. The body of the stabilizer includes a fluid circulation hole 16 therethrough and is normally screwed into the drill bit or, at least, is located not too far above the drill bit. As is noted above, a common position of a stabilizer is in connection with the collar section, which is 100–300 feet above the bit. Located about the body are a plurality of pockets or slots 17 for accommodating wear-resistant inserts, also referred to as "wear elements" or "wear blades", in accordance with the present invention. For illustration purposes, four such pockets are shown evenly spaced around the circumference of the tool; however, three or more such pockets may be employed, if desired.

Each slot 17 accommodates a plurality of wear elements 18, end-to-end, each of the wear elements being hard surfaced for long-lasting wear as a result of contact with the borehole surface. The overall length of the wear elements fits snugly into the longitudinal dimension of slot 17. At the outside dimension, each of the wear elements is as wide at one end as it is at the other end. Hence, one looking at the side of the stabilizer would see uniformly dimensioned wear elements. However, the width of the elements is less than the width of the slot, which also is uniform in its width dimension.

As best shown in FIGS. 2 and 3, it will be seen that slot 17 is undercut to either side, thereby making the opening width of the slot smaller than the corresponding dimension of the bottom of the slot. Along the left side of the wear elements as viewed in the drawings, the underneath side 20 of the elements are uniformly shaped so as to fit snugly in accommodation with the undercut just described.

The right side of the wear elements, on the other hand, are notched on their underneath sides at notches 22. As can be best seen by comparing FIGS. 2 and 3, it may be seen that the notch is not uniformly dimensioned, but is tapered so that the notch is smaller at the bottom end of the wear element that at the top.

A plurality of wedge pieces 24, 26 and 28 are shaped to fit between the wear element and the right side of slot 17 and into slot 22. Wedge piece 24 fits at the bottom end of the wear element and is the smallest of the three wedge pieces. Wedge piece 26 fits at the center position of the wear element. Wedge piece 28 fits at the top end of the wear element and is the largest of the three wedge pieces.

The right side of slot 17 is also undercut. Hence, it may be seen that the right side of each of wedge pieces 24, 26 and 28 are shaped to accommodate to this uniform undercutting at sides 30. A thrust-bearing and locating pin 31 for each wear element fits into a hole in the bottom of the slot and in the underneath side of the wear element.

Slot 17 is slightly elongated on the left and quite a bit longer on the right, leaving an abutting surface 32 at the bottom and 34 at the top for contact with the wear elements that are respectively contiguous therewith. The right elongation of slot 17 at the top is somewhat longer than the right elongation at the bottom. In installation, the wear elements are secured one by one by being placed on their respective pins 31 in the position shown, starting with the bottom wear element, and the wedges pertaining to each element are dropped into the bottom elongation and moved downwardly to the positions illustrated. Therefore, the elongation must be slightly longer than the length of a wedge piece. A driving tool is then used to secure the individual wedges in place, making it possible to separately and independently secure the bottom, center and top end of each wear element.

The wear elements are replaced by first removing the wedge pieces. To loosen wedge piece 24, the tool used therefore operates in the bottom right elongation of slot 17.

It can be seen that when the wedges have secured the wear elements as above described, each is held firmly in place independently so that operation of the stabilizer has no effect in causing related loosenings to occur.

Now referring to FIGS. 4-6, another embodiment 10' of a stabilizer in accordance with the present invention is shown. In this embodiment, the wear elements can be viewed as comprising a right section 18a and a left section 18b, the two side-by-side sections being mirror images of each other. Right side 20a of section 18a is shaped to accommodate to the uniform undercut of slot 17a in which the wear element fit. Left side 20b of section 18b is shaped to accommodate to the uniform undercut of slot 17a. It may be seen that when the sections of the element are in the positions shown, there is a space therebetween.

The underneath side of this space is enlarged so that there is a tapered notch 32 in right section 18a and a tapered notch 34 in the left section, the two notches also being complementary. It may be seen that the notches are tapered so that at the top end of the wear elements the tapered dimension is at its smallest and at the bottom end, the dimension is at its largest.

A plurality of wedge pieces 36, 38 and 40 fit into the notches so that wedge piece 36 is at or near the top of wear elements 18a and 18b, wedge piece 38 is at or near the center of the wear elements and wedge piece 40 is at or near the bottom of the wear pieces.

Slot 17a is greatly elongated in the center at the bottom for the purpose of inserting the wedge pieces during installation and is slightly elongated to permit the loosening of the top wedge piece by a driving tool. As with the previous embodiment, the wear elements are tightened and secured in place by the independent and separate securing of the wedge pieces against the various parts of the wear elements.

It may be further noted that the wedge pieces of the FIG. 4 do not have sides which taper outwardly to fit an undercut; however, if the slot is made in that shape for convenience, then the wedge pieces would also be made to an accommodating shape.

Now turning to the embodiment of the invention shown in FIGS. 7-9, the slot in stabilizer 10" is not elongated axially, but at an angle to the axis which ensures uniform borehole contact by a blade or wear element which is rotating and advancing. Each elongate slot 50, three of which are illustrated for convenience, is uniformly dimensioned with respect to width and accommodates a single wear element positioned end-to-end could be employed, however, in the manner shown for FIG. 1. The slot is undercut at side surfaces 54 and 56 and the wear element is shaped on one side to accommodate to one of the surfaces. On the other side, the wear element is taperedly notched to accommodate wedge pieces 58 and 60. One side of the wedge pieces accommodate to surfaces 56 and 58 and one side to the tapered notch.

In the illustration, the narrow dimension between the tapered underneath side of the wear element and the side of the slot thereopposite is at the bottom side and the longer elongation of the slot where the wedge pieces are secured is toward the top. The operation is otherwise much the same as for the FIGS. 1-3 embodiment except that there are only two wedge pieces rather than three in the illustration.

Now turning to the embodiment shown in FIGS. 10-11, stabilizer 10''' has four wear-element receiving slots 62 positioned uniformly thereabout, each slot being evenly dimensioned with respect to width. Each slot receives a plurality of wear elements end-to-end, for example, wear elements 64, 66, 68 and 70. The top and bottom wear elements have a chamfer face in conventional fashion.

A thrust bearing and locating pin 72 is located by press fit into holes in the bottom of the slot, the projecting part of the pins fitting into holes on the underneath side of the wear elements.

The slot is uniformly undercut on the left and on the right. The wear elements have an undercut surface for accommodating to the undercut on one side and are taperedly notched on their other side. A single wedge piece 74 fitting the notch and remaining undercut is used for securing each of the wear elements. The slot is elongated at the top for receiving the wedge pieces and at the bottom for allowing the driving tool to be used to loosen the bottom wedge piece. It should be further noted that during installation each wear element is placed in place, starting with the bottom one, with its wedge piece to secure the wear element before the next wear element is positioned and secured.

Although the wedging action is shown from top to bottom for the FIGS. 10-11 embodiment, it could be from bottom to top, as with the FIGS. 1-3 embodiment.

Although numerous embodiments have been shown and described, it will be understood that the invention is not limited thereto since many modifications may be made and will become apparent to those skilled in the art. For example, the relative position of wear elements and wedge pieces in FIG. 1 could be reversed.

What is claimed is:

1. A drill string stabilizer for accommodating and retaining a plurality of replaceable wear elements thereabout for contacting the surface of the borehole during drill string operation, said stabilizer having a body including a plurality of longitudinal slots of substantially uniform width, each of said slots being undercut to either side so that the width dimension at the surface of the stabilizer body is narrower than the undercut width, at least one wear element fitting into each of said slots and conforming, on the underneath side thereof, at least on one side, with the undercut portion thereof, the underneath side of said wear element also including a surface at a non-parallel angle with respect to the sides of said slot, said non-parallel angled surface including an undercut surface along at least a portion thereof, and at least one tapered wedge bearing against said angled surface for holding said element in said slot and fitting at least in part within the undercut surface of said non-parallel angled surface and lying beneath the wear surface of said wear element.

2. A drill string in accordance with claim 1, wherein said angled surface on said wear element is a tapered slot having a configuration compatible with said tapered wedge.

3. A drill string stabilizer in accordance with claim 2, wherein there is a space between said element and the side of said slot above said wedge to permit operation of a tool for driving said wedge in tighter engagement and for loosening said wedge during removal.

4. A drill string stabilizer in accordance with claim 1, wherein said slot is elongated to permit insertion of said wedge and to permit operation of a tool for driving said wedge into tighter engagement and for loosening said wedge during removal.

5. A drill string stabilizer in accordance with claim 1, and including at least another tapered wedge, a first wedge being employed near one longitudinal end of said wear element and a second wedge being employed near the opposite longitudinal end of said wear element.

6. A drill string stabilizer in accordance with claim 1, wherein said wedge does not extend radially from said slot.

7. A drill string stabilizer for accommodating and retaining a plurality of replaceable wear elements thereabout for contacting the surface of the borehole during drill string operation, said stabilizer having a body including a plurality of longitudinal slots of substantially uniform width, each of said slots being undercut to either side so that the width dimension at the surface of the stabilizer body is narrower than the undercut width, at least one wear element fitting into each of said slots and conforming, on the underneath side thereof, at least on one side, with the undercut portion thereof, the underneath side of said wear element also including a surface at a non-parallel angle with respect to the sides of said slot, and at least one tapered wedge bearing against said angled surface for holding said element in said slot said wear element including first and second longitudinal sections, said first section having a side conforming with a first undercut side of said slot and said second section having a side conforming with the second undercut side of said slot, said angled surface being at least one of the underneath facing surfaces of said first and second sections, said tapered wedge bearing outwardly against both said first and second sections.

8. A drill string stabilizer in accordance with claim 1, and including thrust means between said wear element and said stabilizer body.

9. A drill string stabilizer in accordance with claim 8, wherein said thrust means includes a radial projection underneath said wear element and an aligned receiving hole within the confines of said slot for accommodating said projection.

10. A drill string stabilizer in accordance with claim 1, and including at least a second wear element fitting into each of said slots and conforming on the underneath side thereof, at least on one side, with the undercut portion thereof, said second wear element longitudinally abutting said first-named wear element, the underneath side of said second wear element also including a surface at an angle with the side of said slot having an undercut surface along at least a portion thereof, and at least a second tapered wedge bearing against said angled surface of said second wear element for holding said element in said slot and fitting at least in part within the undercut surface of said angled surface and lying beneath the wear surface of said second wear element.

11. A drill string stabilizer in accordance with claim 10, and including at least a third tapered wedge bearing against said angled surface of said first-named wear element longitudinally displaced from said first wedge for independent holding of separate portions of said first-named wear element within the slot and fitting at least in part within the undercut surface of said angled surface and lying beneath the wear surface of said first named wear element, and at least a fourth tapered wedge bearing against said angled surface of said second wear element longitudinally displaced from said second wedge for independent holding of separate portions of said second wear element within the slot and fitting at least in part within the undercut surface of said angled surface and lying beneath the wear surface of said second wear element.

12. A drill string stabilizer in accordance with claim 1, wherein said slots are not parallel with the longitudinal axis of said stabilizer body.

13. A drill string stabilizer in accordance with claim 1, wherein said non-parallel angled surface is notched for receiving said tapered wedge.

14. A drill string stabilizer in accordance with claim 13, wherein said tapered wedge includes a surface conforming with the undercut portion of said slot opposite that to which the underneath side of said wear element conforms.

* * * * *